United States Patent [19]

Hupperich

[11] 4,139,161
[45] Feb. 13, 1979

[54] CONTAINER AND GRINDER COMBINATION

[75] Inventor: Peter J. Hupperich, Morton Grove, Ill.

[73] Assignee: Ethyl Products Company, Baton Rouge, La.

[21] Appl. No.: 838,206

[22] Filed: Sep. 30, 1977

[51] Int. Cl.² ............................................. A47J 42/04
[52] U.S. Cl. .................................... 241/162; 241/164; 241/169.1
[58] Field of Search ............... 241/159, 160, 162, 163, 241/164, 168, 169, 169.1

[56] References Cited

U.S. PATENT DOCUMENTS

| 210,837 | 12/1978 | Chalas | 241/169.1 |
| 2,479,151 | 8/1949 | Bostick | 241/169.1 |
| 3,827,641 | 8/1974 | Andersson | 241/169.1 |
| 3,991,947 | 11/1976 | Schlessel | 241/169.1 |

Primary Examiner—Howard N. Goldberg
Attorney, Agent, or Firm—Donald L. Johnson; John F. Sieberth; Edgar E. Spielman, Jr.

[57] ABSTRACT

A two-piece container and grinder combination is disclosed. The container has an upwardly projecting cylindrical post having outwardly extending grinding teeth. The cap is adapted to fit rotatably to the container and has two sets of teeth which cooperate with the teeth on the cylindrical post to grind the ingredients from the container as the ingredients pass from the container between the teeth.

9 Claims, 9 Drawing Figures

CONTAINER AND GRINDER COMBINATION

BACKGROUND OF THE INVENTION

Grinding mechanisms which are fittable to containers are well known in the art. One of the most popularly known and widely used grinder-container combinations is the one utilized to grind pepper corns to yield ground pepper.

Heretofore the vast majority of grinder-container combinations have been composed of multiple parts with the grinding portion of the combination being complex in design and expensive in assembly.

It is therefore an object of this invention to provide a container-grinder combination which only requires two parts. It is also an object of this invention to provide a grinder-container combination which can be made of very inexpensive plastic materials by very inexpensive procedures, i.e., injection molding.

THE INVENTION

This invention relates to a package for grinding and dispensing the contents of the package which package comprises: (1) a container for holding unground product, the container having a cylindrical top wall with at least one aperture through which the unground contents can pass and having a cylindrical post upwardly extending from the center of the top wall, the cylindrical post having outwardly extending grinding teeth; and (2) a plastic, integrally formed, one-piece cap having : (i) a top wall with at least one dispensing port through which the ground contents can pass; (ii) a cylindrical sealing surface below said top wall for forming a rotating seal with the cylindrical top wall; (iii) means for mounting the cap to the container, the cap being rotatable about the center axis of the post; (iv) a first arc of inwardly extending grinding teeth, the first arc having a radius greater than the radius of the post, and a second arc of inwardly extending grinding teeth, the second arc being opposite the first arc and having a radius substantially identical to the radius of the first arc, the first and second arc of teeth being adjacent the outwardly extending teeth to cooperate therewith to grind the unground contents when the cap is rotated; and, (v) a circular set of teeth between the first and second arcs of teeth and the cap top wall, the circular set of teeth surrounding the outwardly extending teeth to cooperate therewith to further grind the ground contents when the cap is rotated.

As can be appreciated from the above, a package of this invention is the paragon of simplicity. Only two parts are needed for the package thus overcoming the disadvantages of prior art containers and grinders which require multiple parts. Also, since the cap portion is of plastic, it can be easily formed in one integral piece by the simple process of injection molding. When the container is of plastic it also can be formed by injection molding and, thus, further reduction in the price of the container is also accomplished. Exemplary materials of which the cap can be made are acrylonitrile butadiene styrene, polycarbonate, acetal, etc., while the container can be made of styrene acrylonitrile, polystyrene, polycarbonate, etc.

These and other features of this invention contributing satisfaction in use and economy in manufacture can be more fully understood when taken in conjunction with the accompanying drawings in which identical numerals refer to identical parts and in which.

Figure 1:
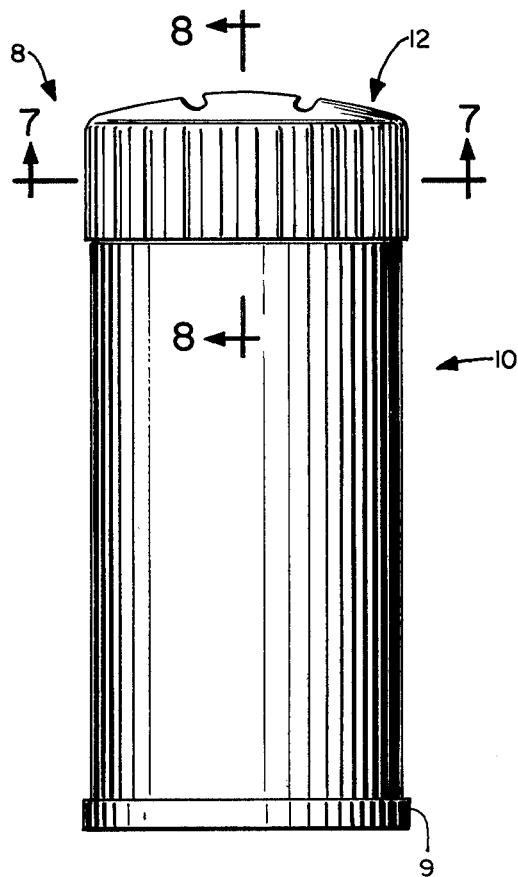
FIG. 1 is a side elevational view of a package of this invention.
Figure 9:
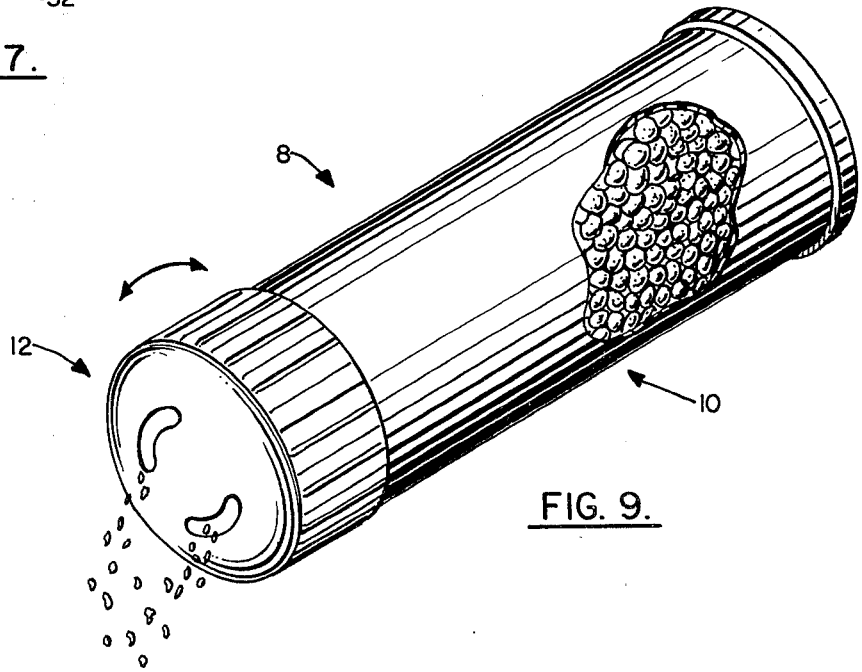
FIG. 9 is a perspective view of the container of this invention shown in use.

Referring now to FIG. 1, there is shown a package of this invention, generally designated by the numeral 8, which includes a cap, generally designated by the numeral 12. Container 10, as shown in the drawings, is cylindrical in shape, as is cap 12. It is to be understood, however, that other shapes may be utilized, for example, cap 12 and container 10 may be square in cross-section. FIGS. 1 and 9 show that container 10 has a bottom 9 which is preferably removable from container 10 to facilitate filling of container 10 with the product to be ground.

Figure 2:
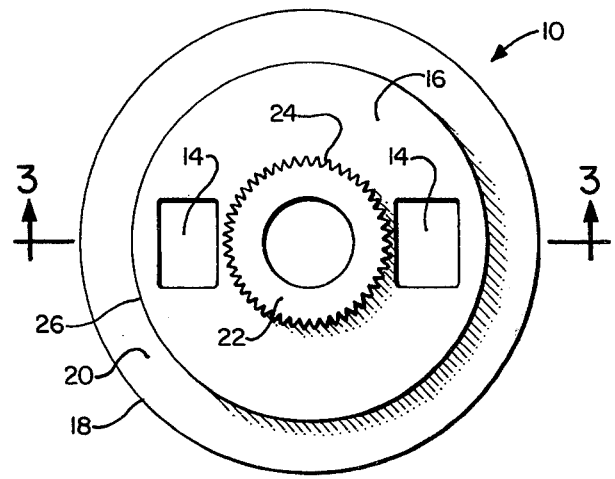
FIG. 2 is a top plan view of the container shown in FIG. 1.
Figure 3:
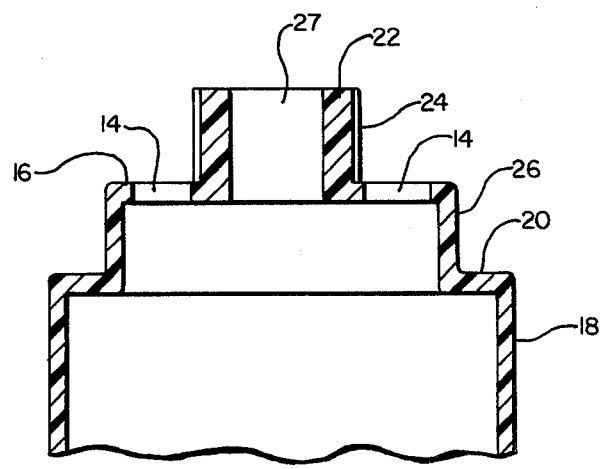
FIG. 3 is a partial sectional view of the top portion of the container shown in FIG. 2 taken through section lines 3—3 in FIG. 2.

In FIGS. 2 and 3, it is shown that container 10 has cylindrical sidewall 18 which is closed at its bottom. Turning inwardly of sidewall 18 is annular top wall 20. Extending upward from annular top wall 20 is top sidewall 26. Perpendicular to top sidewall 26 is top wall 16. Top wall 16 will provide a matching surface for achieving a seal with cap 12 as hereinafter described. In top wall 16 there are provided apertures 14. Two apertures are shown for the illustrated embodiment, however, it is to be understood that more or less apertures may be utilized and that the shape of the apertures can vary as the need requires. Projecting upwardly from top wall 16 is cylindrical post 22. Note that cylindrical post 22 is preferably hollow having cylindrical passage 27 therethrough. Mounted about the outside surface of cylindrical post 22 are outwardly extending grinding teeth 24, which teeth run in a direction parallel to the center axis of post 22.

Figure 4:
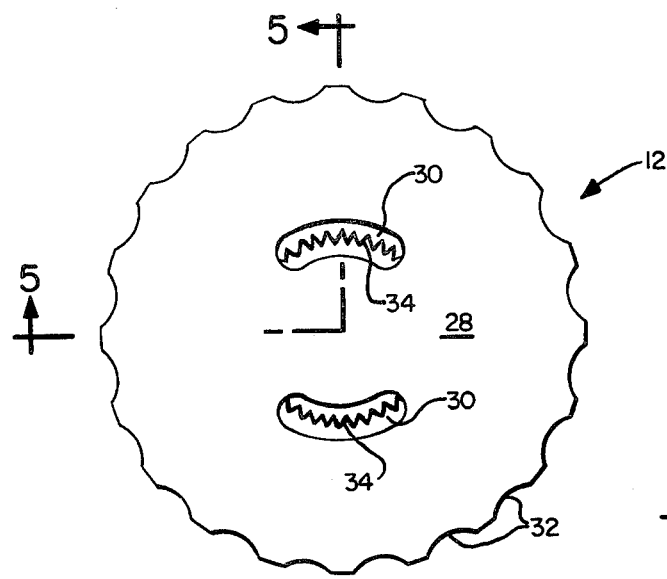
FIG. 4 is a top plan view of the cap shown in FIG. 1.
Figure 5:
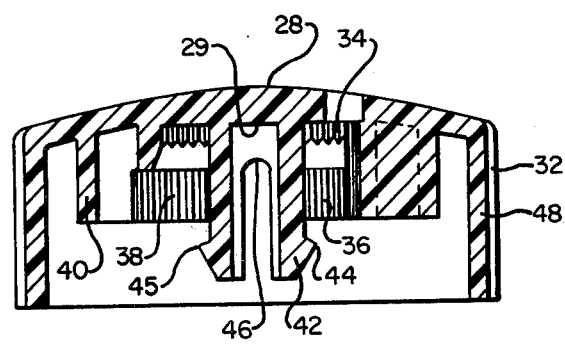
FIG. 5 is a sectional view taken through section lines 5—5 of FIG. 4.
Figure 6:
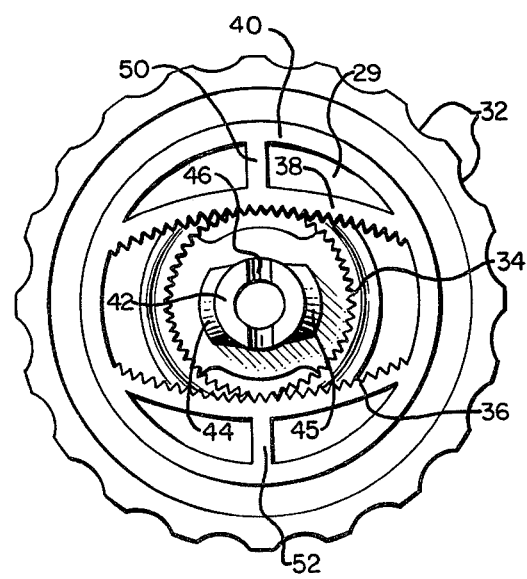
FIG. 6 is a bottom plan view of the cap shown in FIG. 1.
Figure 8:
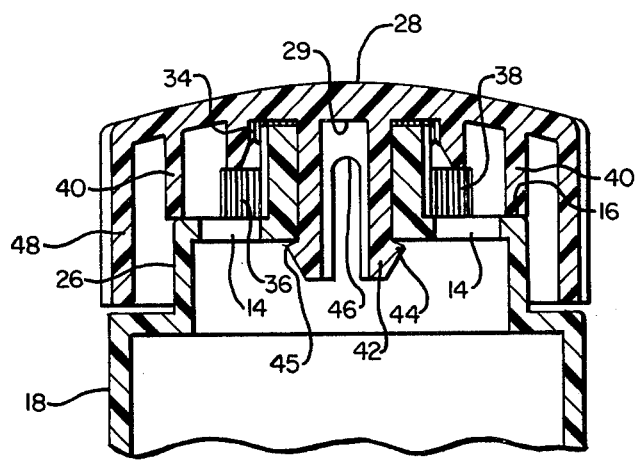
FIG. 8 is a sectional view taken through section lines 8—8 of FIG. 1.

As shown in FIG. 1, cap 12 fits to container 10. Cap 12, as shown in FIGS. 4, 5 and 6, has top wall 28 with downwardly depending therefrom annular cap sidewall 48. Cap sidewall 48 has arcuate identation 32. Identation 32 aids the user in obtaining a firm grip on cap 12 for achieving the grinding motion hereinafter described. In cap top wall 28 there are dispensing ports 30. The number and design of the dispensing ports is optional with the illustrated ports being highly suitable for most grinding operations.

FIGS. 5 and 6 show the arrangement of the various grinding teeth which are part of cap 12. The bottom set of grinding teeth are made up of a first arc of integrally extending grinding teeth 36 and a second arc of inwardly extending grinding teeth 38. As can be seen in FIG. 6, both of these arcs have a radius greater than the radius of post 22. By having the radius of the arcs longer than the radius of post 22, there is provided a sufficient gap between these interacting sets of teeth for the contents of the package to be pulled into grinding communication with the outwardly extending grinding teeth 24 and the two arcs of inwardly extending grinding teeth 36 and 38.

As is shown in FIG. 6, the relationship between the two radii will yield a curved wedged shaped space which is zero degrees at the tangent point and opens to a progressively larger angle. As the space becomes smaller, the size of the particle which can be ground becomes smaller. The converse is also true in that the larger the space the larger the particle which can be ground. The important aspect of sizing the two sets of interacting teeth is, as before noted, to insure that the relationship allows for feed of the material to be ground at the zero degree tangent point. It has been found that when grinding contents having the size of papper corns the radius of post 22 should be at least about ¼ inch with the radius of the first and second arcs being preferably at least about ¾ inch. It is noted that for the sake of uniformity, the first and second arcs are substantially identical in their radii.

Directly above teeth 38 and 36, there is provided a circular set of teeth 34. These teeth also cooperate with outwardly extending grinding teeth 24. The diameter of these teeth will be such that the distance between teeth 34 and teeth 24 will be sized to yield grinding action on the ingredients subsequent to the grinding between teeth 24 and teeth 36 and 38. The smaller the distance, the finer the resulting ground product achieved.

Figure 7:
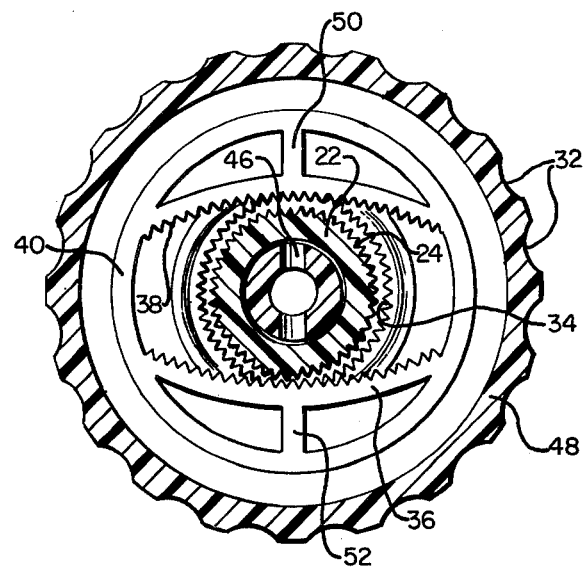
FIG. 7 is a sectional view taken through section lines 7—7 of FIG. 1.

Downwardly depending from the inside wall 29 of cap top wall 28 is annular sealing wall 40. Annular sealing wall 40 is dimensioned so that it matches flush with top wall 16 as is shown in FIG. 7 to provide a seal.

In the center of cap 12 and projecting downward from the inside wall 29 of top wall 28 is cap post 42. Cap post 42 has cut therein collapsing groove 46. Also on the outside of cap post 42 are latching lug 44 and 45. Cap post 42 is dimensioned to pass within the cylindrical passage 27 of post 22 since latching lugs 44 and 45 provide post 42 with a diameter greater than the diameter of passage 27. Cap post 42 utilizes collapsing groove 46 to allow cap post 42 to collapse and thus pass through post 22. Once latching lugs 45 and 44 pass completely through post 22, pressure on cap post 42 is relieved and locking lugs 44 and 45 snap back to their original position thus preventing axial upward movement of cap 12.

As shown in FIG. 6, the embodiment depicted utilizes optional support members 52 and 50. These members lend rigidity to first arc 36 and second arc 38.

The size of the material to be ground and the ultimate desired size sought is determined by the tooth sizes of the various teeth and by the distance between the outwardly extending teeth 24 and the various teeth 36, 38 and 34 carried by cap 12. Since the teeth utilized in the package of this invention have to withstand great grinding pressure, it has been found that the teeth have a 45 degree pitch. The number of teeth utilizeed per linear inch will be determined by what is being ground and how fine it is to be ground as before noted. It has been found that when grinding pepper corns that the number of teeth per linear inch for teeth 24 and the various teeth carried by cap 12 will be within the range of from about 15 to about 60 teeth per inch. When grinding pepper corns it has been found that the smallest distance between the outwardly extending teeth 24 and the teeth carried by cap 12 should be within the range of from about 0.010 to about 0.030 inches.

FIGS. 1 and 7 through 9 show cap 12 rotatably mounted to container 10. The user holds container 10 while rotating cap 12 in a back and forth motion. This motion, while holding the package in an inverted or semi-inverted position, results in the unground contents of container 10 passing through apertures 14 into chambers formed by outwardly extending grinding teeth 24, and the first and second arcs of teeth 36 and 38, respectively, and the inside wall of sealing wall 40. As outwardly extending grinding teeth 24 are moved towards the first and second arcs of teeth 26 and 38 respectively, the contents are drawn into and are ground between outwardly extending teeth 24 and the first and second arc of grinding teeth 36 and 38. These contents continue to move towards dispensing ports 30. Prior to passing through dispensing ports 30, however, the ground contents are reground again by the action of circular teeth 34 and outwardly extending grinding teeth 24. After passing through these last two sets of teeth, the finely ground contents pass through dispensing ports 30 to their final consumption by the user.

While adequate description of the preferred embodiments of the present invention has been shown and made for purposesof illustrating the invention, it will be readily apparent to those skilled in the art that numerous changes and modifications may be made to the package of the present invention without departing from the spirit and scope of the invention.

What is claimed is:

1. A package for grinding and dispensing the contents of the package, which package comprises:
    a. a container for holding unground product, said container having a cylindrical top wall with at least one aperture through which the unground contents can pass and having a cylindrical post upwardly extending from the center of said top wall, said cylindrical post having outwardly extending grinding teeth; and
    b. a plastic, integrally formed, one-piece cap having:
        i. a top wall with at least one dispensing port through which the ground contents can pass,
        ii. a cylindrical sealing surface below said top wall for forming a rotating seal with said cylindrical top wall,
        iii. means for mounting said cap to said container, said cap being rotatable about the center axis of said post,
        iv. a first arc of inwardly extending grinding teeth, said first arc having a radius greater than the radius of said post, and a second arc of inwardly extending grinding teeth, said second arc being opposite said first arc and having a radius substantially identical to the radius of said first arc, said first and second arcs of teeth being adjacent said outwardly extending teeth to cooperate therewith to grind said unground contents when said cap is rotated, and,
        v. a circular set of teeth between said first and second arcs of teeth and said cap top wall, said circular set of teeth surrounding said outwardly extending teeth to cooperate therewith to further grind said ground contents when said cap is rotated.

2. The package of claim 1 wherein the radius of said post is at least about ¼ inch and the radius of said arc is at least about ¾ inch.

3. The package of claim 1 wherein said sealing surface is the bottom wall of an annular wall downwardly depending from said top wall.

4. The package of claim 1 wherein said cylindrical post is hollow and said means for mounting is a cap post downwardly depending from said top wall, said cap post being dimensioned to fit within said cylindrical hollow post and having at its distal end interference means to prohibit upward axial movement of said cap once said interference means passes through said cylindrical post.

5. The package of claim 1 wherein said container is cylindrical and has a removable bottom wall.

6. The package of claim 2 wherein said sealing surface is the bottom wall of an annular wall downwardly depending from said top wall.

7. The package of claim 6 wherein said cylindrical post is hollow and said means for mounting is a cap post downwardly depending from said top wall, said cap post being dimensioned to fit within said cylindrical hollow post and having at its distal end interference means to prohibit upward axial movement of said cap once said interference means passes through said cylindrical post.

8. The package of claim 7 wherein said container is cylindrical and has a removable bottom wall.

9. The package of claim 1 wherein the container is plastic.

* * * * *

UNITED STATES PATENT AND TRADEMARK OFFICE
CERTIFICATE OF CORRECTION

PATENT NO. : 4,139,161
DATED : February 13, 1979
INVENTOR(S) : Peter J. Hupperich It is certified that error appears in the above–identified patent and that said Letters Patent are hereby corrected as shown below:

Col. 2, line 51 reads "identation 32. Identation", should read --indentation 32. Indentation --.
Col. 3, line 14 reads "papper", should read --pepper--.
Col. 3, line 54 reads "withstandgreat", should read --withstand great--.
Col. 4, line 23 reads "purposesof", should read --purposes of--.

Signed and Sealed this

Fourth Day of September 1979

[SEAL]

Attest:

LUTRELLE F. PARKER

Attesting Officer     Acting Commissioner of Patents and Trademarks